US008239459B2

(12) United States Patent
Sato

(10) Patent No.: US 8,239,459 B2
(45) Date of Patent: Aug. 7, 2012

(54) DATA PROCESSING APPARATUS AND DATA PROCESSING METHOD

(75) Inventor: Eiichi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1003 days.

(21) Appl. No.: 11/559,284

(22) Filed: Nov. 13, 2006

(65) Prior Publication Data

US 2007/0159652 A1    Jul. 12, 2007

(30) Foreign Application Priority Data

Nov. 30, 2005 (JP) .................... 2005-345973

(51) Int. Cl.
*G06F 15/16* (2006.01)
*G06F 17/00* (2006.01)
*G06F 21/00* (2006.01)
(52) U.S. Cl. ............. 709/206; 707/704; 709/202; 711/6
(58) Field of Classification Search .......... 709/204–206, 709/208–211
See application file for complete search history.

(56) References Cited

U.S. PATENT DOCUMENTS

| 6,711,594 B2 * | 3/2004 | Yano et al. ........................... 1/1 |
| 2006/0026373 A1 * | 2/2006 | Kaneda et al. ................. 711/162 |
| 2007/0168556 A1 * | 7/2007 | Tanimoto et al. ............. 709/246 |
| 2007/0168912 A1 * | 7/2007 | Takashima et al. ........... 717/101 |

FOREIGN PATENT DOCUMENTS

JP            2003-274102 A       9/2003

* cited by examiner

*Primary Examiner* — Haresh N Patel
*Assistant Examiner* — Evans Desrosiers
(74) *Attorney, Agent, or Firm* — Canon USA Inc IP Division

(57) ABSTRACT

An apparatus and method for communication between an apparatus and at least one other apparatus, the apparatus and method including inputting data to be transmitted to the at least one other apparatus, transmitting, to the at least one other apparatus, a program for producing a storage destination in the at least one other apparatus that stores the inputted data, receiving, from the at least one other apparatus, information indicating the storage destination created based on the program and, designating the created storage destination based on the received information and transmitting the inputted data to the at least one other apparatus.

5 Claims, 17 Drawing Sheets

FIG.16

E-MAIL SETTINGS

UPPER LIMIT OF
TRANSMISSION FILE SIZE:   [ 1.0 ]  MB   [ UP ]   [ DOWN ]

[ SET ]   [ CANCEL ]

DATA PROCESSING APPARATUS AND DATA PROCESSING METHOD

BACKGROUND OF THE INVENTION

1. Field of the Invention

The present invention relates to a data processing apparatus and a data processing method for transmitting predetermined data to an external apparatus.

2. Description of the Related Art

The LAN technologies can provide a network environment in which users can operate various data processing devices, such as multifunction peripherals, scanners, and printers. For example, in a LAN network, users of information processing devices (i.e., host computers) can share a scanner function of a multifunction peripheral and store image data read by a scanner in an arbitrary host computer in the network.

In the network, a user of a multifunction peripheral can designate, on an operation panel, a host computer as a destination of image data and can directly transmit the image data read by the scanner to the designated host computer.

More specifically, image data read by a scanner can be converted (formatted) into PDF or TIFF image data and can be transmitted as an attached file of an electronic mail to a host computer according to the SMTP protocol. [E]Furthermore, a server message block (SMB) can be used to transmit the image data to a host computer.

In the operation for transmitting the image data to the host computer using the SMB, the user operating the multifunction peripheral is required to accurately input an ID (i.e., a host name) of the host computer (i.e., transmission destination) and a folder path (i.e., storage destination) that stores the image data. Furthermore, the user is required to accurately input a user name and a password to access the folder.

As discussed in Japanese Patent Application Laid-open No. 2003-274102, an image reading apparatus can retrieve destination information (e.g., host name or folder name) before starting SMB transmission of image data. Then, the image reading apparatus displays a list of retrieval result on a touch panel to let a user select a desired destination.

According to the above-described technique, a data processing device (i.e., a transmitter of image data) can simply set information required for transmission of the data.

However, when a data processing device inputs image data and performs data transmission using an SMB to an external apparatus, it is required that not only the information required for the data transmission is set in the data processing device but also a storage destination of the data is created in the external apparatus (i.e., a receiver of the data).

However, according to currently implemented techniques, a user of the data processing device (i.e., transmitter of the data) cannot make any operation for the data transmission unless the user accomplishes settings for the external apparatus (i.e., receiver of the data) that creates a storage destination of the data.

SUMMARY OF THE INVENTION

Exemplary embodiments of the present invention are directed to a technique for enabling a data processing device (i.e., a transmitter) to control a receiver to create a storage destination of data in accordance with user's instruction on the data processing device.

According to an aspect of the present invention, an apparatus configured to communicate with at least one other apparatus includes an input unit configured to input data to be transmitted to the at least one other apparatus, a first transmission unit configured to transmit, to the at least one other apparatus, a program for creating a storage destination in the at least one other apparatus that stores the data inputted by the input unit, a reception unit configured to receive, from the at least one other apparatus, information indicating the created storage destination, and a second transmission unit configured to designate the created storage destination based on the information received by the reception unit and transmit the data inputted by the input unit to the at least one other apparatus.

According to another aspect of the present invention, an apparatus configured to communicate with at least one other apparatus includes a first input unit configured to input data to be transmitted to the at least one other apparatus, a second input unit configured to input information required for creating a storage destination that stores the data inputted by the first input unit, a first transmission unit configured to transmit, to the at least one other apparatus, a program for creating the storage destination that stores the data inputted by the first input unit based on the information inputted by the second input unit, and a second transmission unit configured to designate the storage destination created in the at least one other apparatus based on the program and transmit the data inputted by the input unit to the at least one other apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 16 is a view illustrating a screen displayed on the liquid crystal touch panel of the multifunction peripheral in accordance with a third exemplary embodiment of the present invention.

DETAILED DESCRIPTION OF THE EMBODIMENTS

Figure 1:
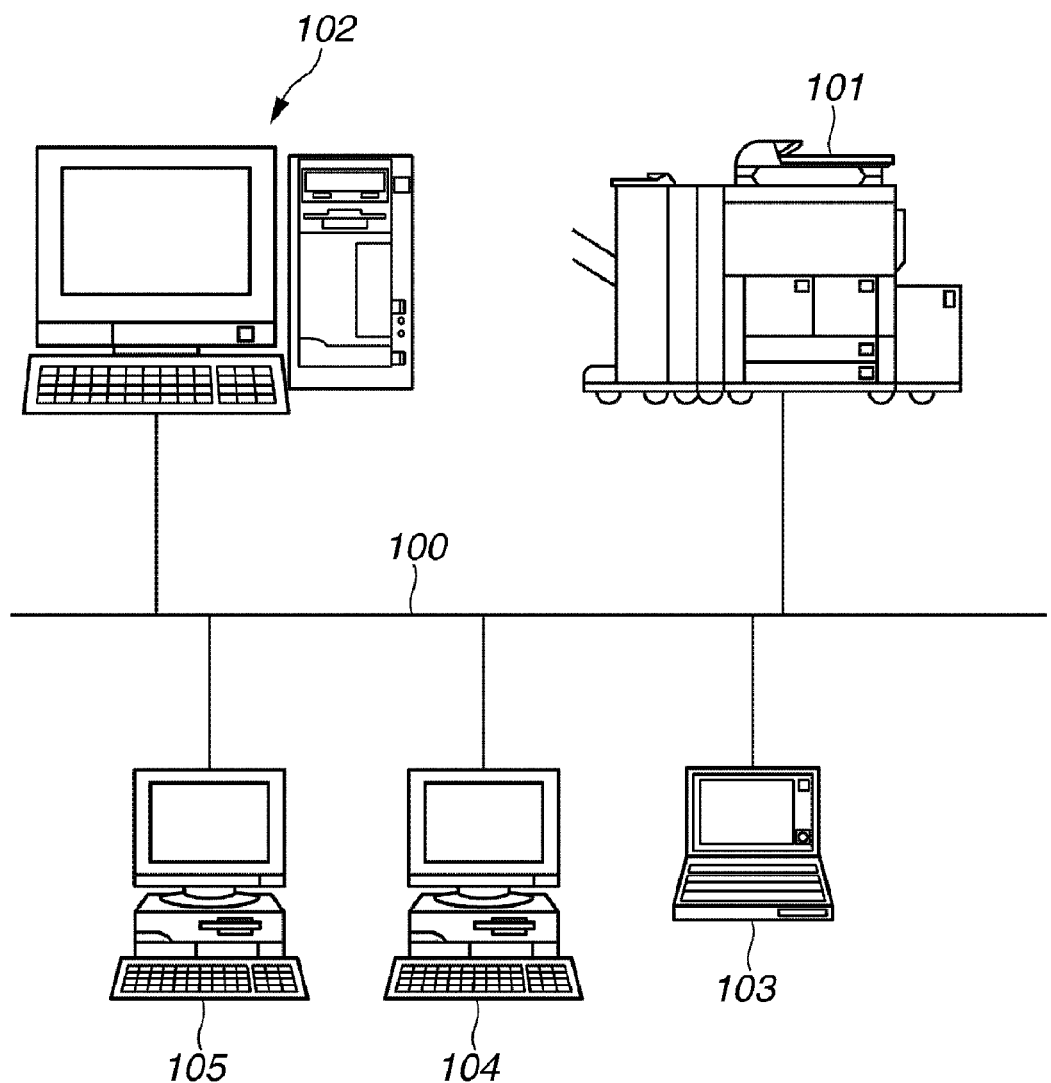
FIG. 1 is a schematic diagram illustrating a system arrangement in accordance with an exemplary embodiment of the present invention.

The following description of exemplary embodiments is merely illustrative in nature and is in no way intended to limit the invention, its application, or uses.

Processes, techniques, apparatus, and systems as known by one of ordinary skill in the art may not be discussed in detail, but are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments will be described in detail below with reference to the drawings.

First Exemplary Embodiment

FIG. 1 is a schematic diagram illustrating a communication system in accordance with a first exemplary embodiment of the present invention. In FIG. 1, a data processing apparatus 101 can be connected to a local area network (LAN) 100 via an interface, such as 100 Base-T with an RJ-45 interface. In the present embodiment, an example of the data processing apparatus 101 is a multifunction peripheral. However, the data processing apparatus 101 is not limited to a multifunction peripheral, and can be a printer, a scanner, a facsimile, a copying machine, a server, or any other device that would enable practice of the present invention.

Personal computers (hereinafter, referred to as PC) 102, 103, 104, and 105 are connected to the LAN 100. The PCs 102, 103, 104, and 105 communicate with the multifunction peripheral 101 via the LAN 100. The LAN 100 can provide a networking service for a local user group including users on the same floor, or continuous floors, of a building.

Furthermore, a wide area network (WAN) can be used to configure a network for users separated in different buildings at the same location or located at different locations remote from one another. The WAN is an assembly of two or more LANs connected via high-speed digital lines, such as wide area Ethernet or ISDN telephone lines. The connection of LANs is a simple electric connection realized by buses.

The data processing apparatus of the present embodiment is configured to designate a storage destination of input data and transmit the data to an external apparatus (e.g., PC 500). The input data can include image data read by a scanner (i.e., input unit) of the multifunction peripheral (i.e., data processing apparatus), data entered from an external apparatus via the network, or data stored beforehand in the data processing apparatus.

The storage destination of the data can be a shared folder on the external apparatus or a predetermined storage region on a hard disk drive (HDD) of the external apparatus.

The data processing apparatus of the present embodiment can use a server message block (SMB) to designate a storage destination of data and transmit the data to the designated destination (i.e., the external apparatus). The present embodiment is not limited to the use of an SMB to designate a storage designation, and any method for designating a storage location that would enable practice of the present invention is applicable.

Figure 2:
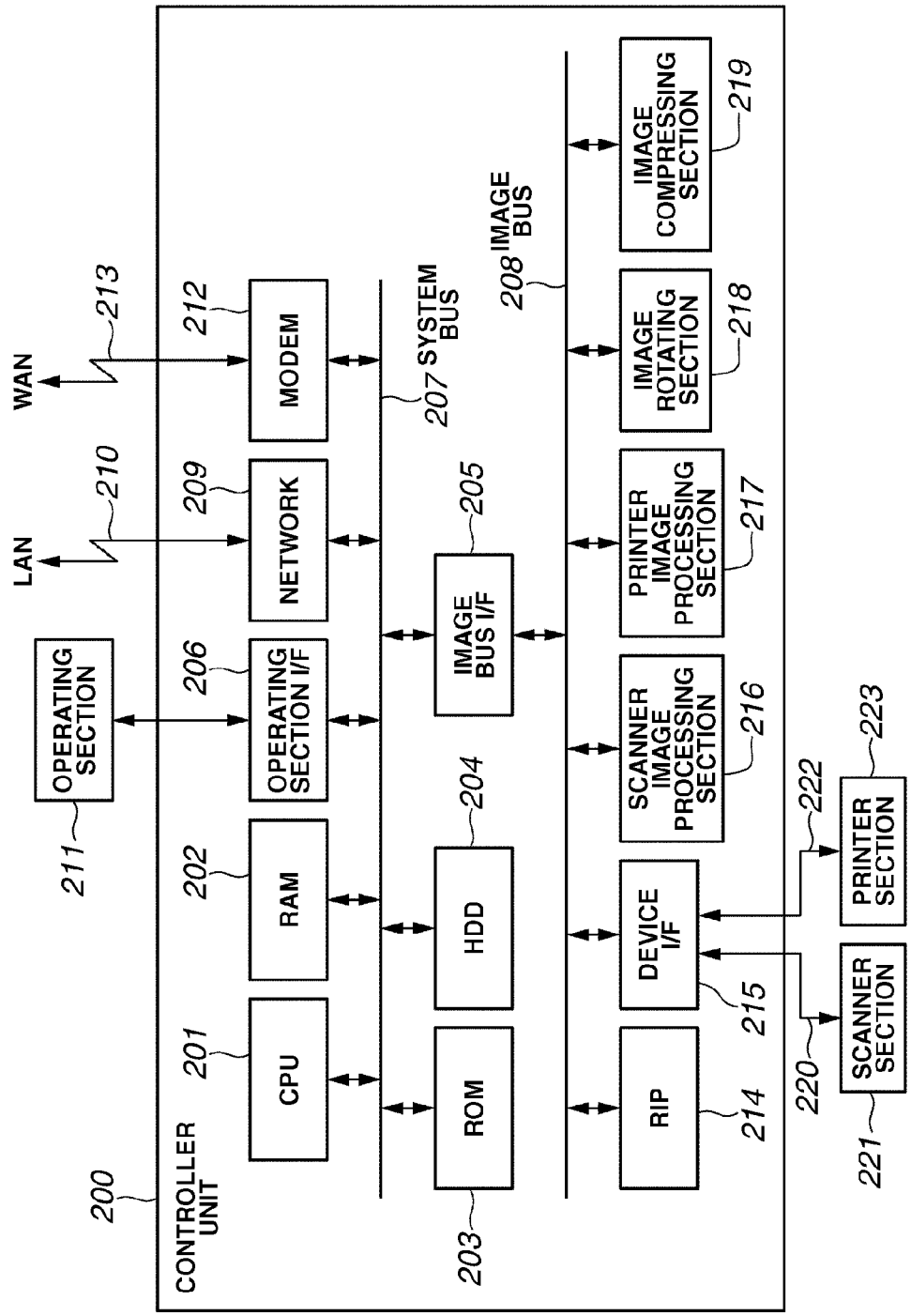
FIG. 2 is a block diagram illustrating a hardware configuration of a multifunction peripheral in accordance with a first exemplary embodiment of the present invention.

A detailed description of the multifunction peripheral 101 will now be described. FIG. 2 is a block diagram illustrating a hardware configuration of the multifunction peripheral 101 in accordance with the present embodiment.

In FIG. 2, a controller unit 200 is connected to a scanner section (i.e., an image input device) 221 and a printer section (i.e., an image output device) 223. Furthermore, the controller unit 200 can input and output image information and device information from and to network devices via the LAN 210 and the public circuit (WAN) 213.

In the controller unit 200, a CPU 201 controls the overall system of the multifunction peripheral. RAM 202 functions as a system work memory that enables the CPU 201 to operate, and can also function as an image memory that temporarily stores image data. ROM 203 stores a boot program of the system. HDD 204 stores system software and image data.

An operating section I/F 206 is an interface section provided between the CPU 201 and an operating section 211. The operating section I/F 206 can output the image data to be displayed on the operating section 211. The CPU 201 can receive, from the operating section I/F 206, instructions and data if entered by a user of the system using the operating section 211.

A network 209, connected to the LAN 210, can perform input/output processing of information. A modem 212, connected to the public circuit (WAN) 213, can perform input/output processing of information. A system bus 207 connects all of the above-described devices in the controller unit 200.

An image bus I/F 205 is a bus bridge that converts the data structure of image data transferred between the system bus 207 and an image bus 208. The image bus 208 is, for example, a PCI bus or IEEE1394. The following devices are located on the image bus 208.

Raster image processor (RIP) 214 expands page description language (PDL) code into a bit map image. Device I/F section 215, connecting the controller unit 200 to an image input/output device (e.g., the scanner section 221 and the printer section 223), performs synchronous/asynchronous conversion of image data. The scanner section 221 is an input unit that can scan and input data to be transmitted to a host computer (not shown).

Scanner image processing section 216 applies various processing (e.g., correction, modification, and edit) to the input image data. Printer image processing section 217 performs correction for a printer and conversion of resolution for the print output image data. Image rotating section 218 rotates image data. Image compressing section 219 compresses and expands multi-value image data by Joint Photographic Experts Group (JPEG) and binary image data by Joint Bi-level Image experts Group (JBIG), modified read (MMR) or modified Huffman (MH).

Figure 3:
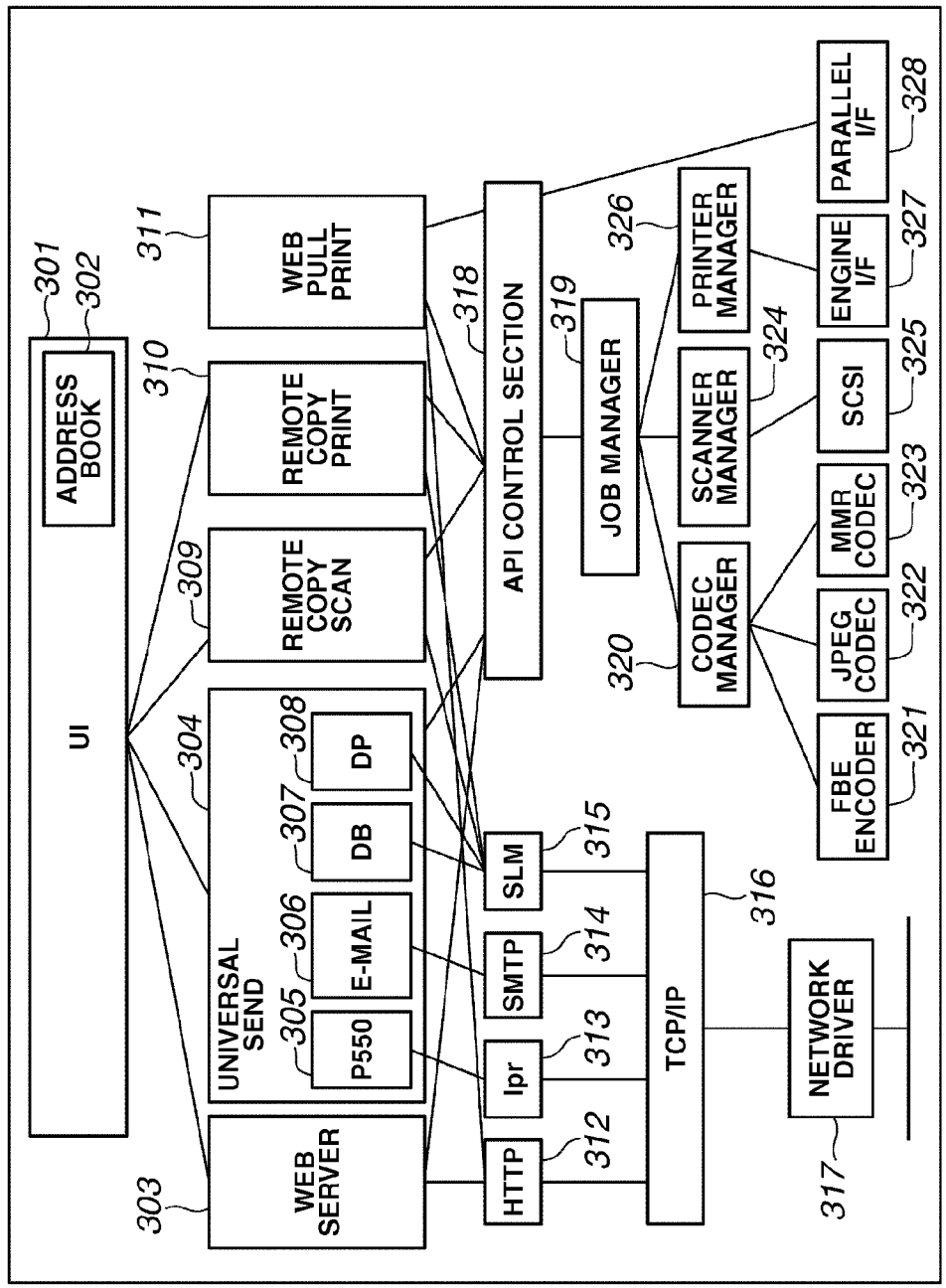
FIG. 3 is a block diagram illustrating a software architecture of the multifunction peripheral in accordance with the first exemplary embodiment.

FIG. 3 is a block diagram illustrating a software architecture of the multifunction peripheral 101 in accordance with the present embodiment.

As illustrated in FIG. 3, a user interface (UI) 301 is a module that enables an operator to perform various operations and settings for the multifunction peripheral. The user interface 301 can transfer information entered by the operator to other modules (described below), and enables the operator to initiate processes and set data.

Address book 302 is a database module that manages a transmission destination and a communication partner of the data. An operator can add information to or delete or obtain contents from the address book 302 via the user interface 301. Based on an operator's input, the data or communication partner information stored in the address book 302 can be transmitted to each of the modules described below.

Web server module 303 transmits, when requested by a web client (not shown), management information of the multifunction peripheral 101. The management information is read via an API control section 318 (described below) and is provided to the web client via HTTP 312, TCP/IP 316, and network driver 317.

Universal-send module 304 delivers the data input by an operator via the user interface 301 to a communication (output) destination instructed by the operator. Furthermore, when production of delivery data is instructed by an operator using a scanner function of the multifunction peripheral 101, the universal-send module 304 operates the multifunction peripheral device via the API control section 318 in order to produce the data.

A P550 module 305 is executed when a printer is designated as an output destination in the universal-send module 304. An e-mail module 306 is executed when an e-mail address is designated as a communication partner in the universal-send module 304. A DB module 307 is executed when a database is designated as an output destination in the universal-send module 304. A DP module 308 is executed when a multifunction peripheral similar to the multifunction peripheral of the present embodiment is designated as an output destination in the universal-send module 304.

Remote copy scan module 309 uses a scanner function of the multifunction peripheral 101 and designates another multifunction peripheral connected to the network as an output destination and enables the designated multifunction peripheral to perform processing similar to the copy function realized by the multifunction peripheral 101. Remote copy print module 310 uses a printer function of the multifunction peripheral 101 and designates another multifunction peripheral connected to the network as an input destination and enables the designated multifunction peripheral to perform processing similar to the copy function realized by the multifunction peripheral 101.

Web-pull-print module 311 reads information from various home pages via the Internet or Intranet and prints the information. HTTP module 312 is used when the multifunction peripheral 101 performs HTTP communications, and enables the web server 303 and the web-pull-print module 311 to perform communications via the TCP/IP module 316. Lpr module 313 enables the printer module 305 of the universal-send module 304 to perform communications via the TCP/IP module 316. SMTP module 314 enables the e-mail module 306 of the universal-send module 304 to perform communications via the TCP/IP module 316.

A salutation manager SLM (SLM) module 315 enables the database module 307 and the DP module 308 of the universal-send module 304, the remote copy scan module 309, and the remote copy print module 310 to perform communications via the TCP/IP module 316. The TCP/IP communication module 316 enables the above-described modules to perform network communications via the network driver 317. The network driver 317 can control peripheral devices connected to the network.

The API control section 318 functions as an interface between upstream modules, including the universal-send module 304, and downstream modules, including a job manager 319. The API control section 318 also reduces the dependency between the upstream and downstream modules and increases their diversification. The job manager 319 interprets the processing instructions provided, via the API control section 318, by the above-described modules and provides instructions to additional modules described below. Furthermore, the job manager 319 manages the hardware processing executed in the multifunction peripheral 101.

Codec manager 320 manages and controls the compression and expansion of data in the processing instructed by the job manager 319. FBE encoder 321 compresses the data read in the scan processing executed by the job manager 319 and a scan manager 324 into FBE format data. Furthermore, JPEG codec 322 performs JPEG compression of readout data in the scan processing and JPEG expansion processing of print data in the print processing. An MMR codec 323 performs MMR compression of readout data in the scan processing executed by the job manager 319 and the scan manager 324 and MMR expansion processing of print data in the print processing executed by the print manager 326.

Scan manager 324 manages and controls scan processing instructed by the job manager 319. Furthermore, SCSI driver 325 communicates with the scan manager 324 and a scanner section 221 of the multifunction peripheral 101. The print manager 326 manages and controls print processing instructed by the job manager 319. Engine I/F driver 327 provides an interface between the print manager 326 and a printing section. Parallel port driver 328 provides an interface used when the web-pull-print 311 outputs data via a parallel port to an output device (not shown).

Figure 4:
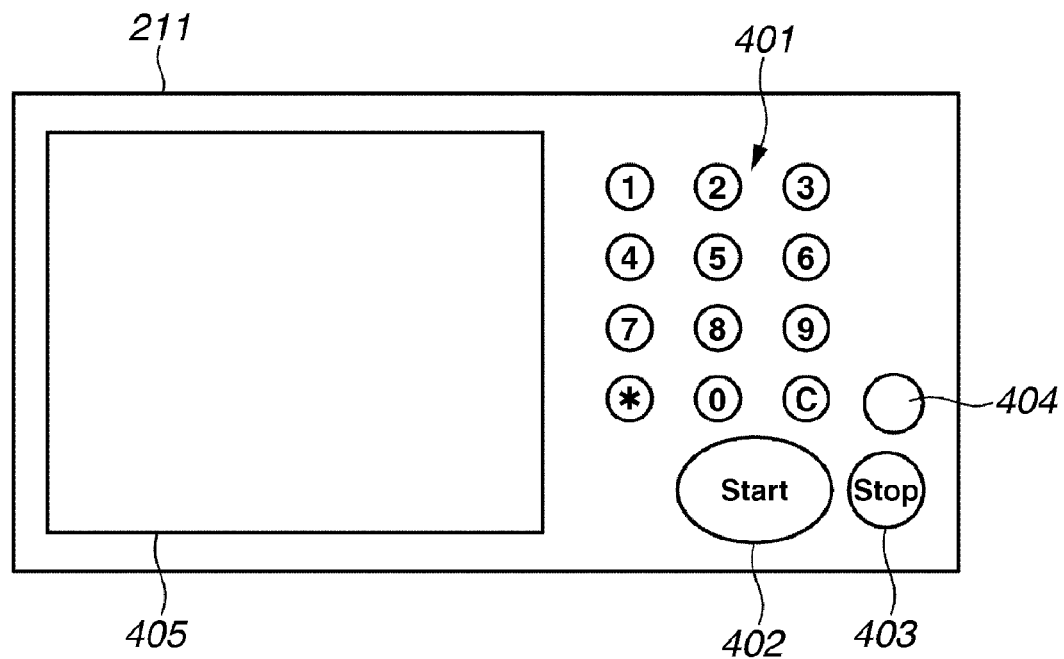
FIG. 4 is an illustration of an operating section of the multifunction peripheral in accordance with the first exemplary embodiment.

FIG. 4 is an illustration of the operating section 211 of the multifunction peripheral 101. As illustrated in FIG. 4, the operating section 211 includes register keys 401, a copy start key 402, a stop key 403, a transmission button 404, and a liquid crystal touch panel 405.

The transmission button 404 enables a user to instruct transmission of image data read out by the scanner section 221 of the multifunction peripheral 101 via the LAN 100 to the PCs 102-105. To instruct the transmission, a user is required to input an ID (host name) of a destination PC (102-105) and information (e.g., a path to the shared folder) indicating a storage destination that stores the transmitted image data. Furthermore, a user is required to input a user name and a password to access (log-in) the destination PC (102-105). In the present embodiment, a user can perform the input operation using the user interface (UI) screen displayed on the liquid crystal touch panel 405.

Figure 5:
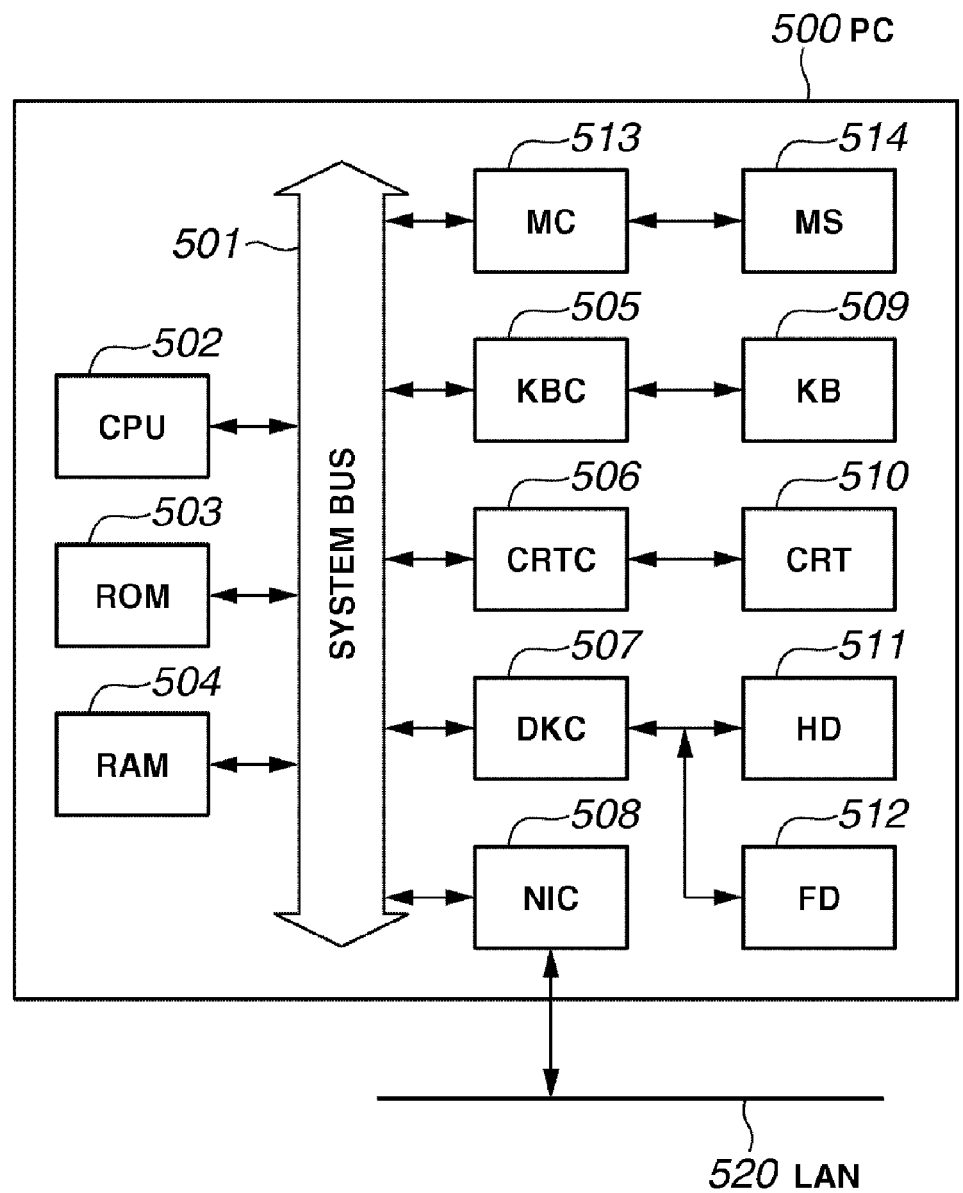
FIG. 5 is a block diagram illustrating an internal arrangement of a personal computer in accordance with the first exemplary embodiment.

FIG. 5 is a block diagram illustrating an internal arrangement of a personal computer 500 in accordance with the present embodiment, wherein personal computer 500 can be used as PCs 102 to 105 of FIG. 1. PC 500 includes a CPU 502 that executes predetermined programs stored in a ROM 503, on a hard disk (HD) 511, or supplied from a floppy disk drive (FD) 512. The CPU 502 controls the components of personal computer 500 via system bus 501.

RAM 504 functions as a main memory or as a work area of the CPU 502. Keyboard controller (KBC) 505 controls instructions entered from a keyboard (KB) 509, as well as from a pointing device (not shown). CRT controller (CRTC) 506 controls the display of a CRT display unit (CRT) 510. Disk controller (DKC) 507 controls access to the hard disk (HD) 511 and the floppy disk controller (FD) 512 which, in addition to the predetermined programs executed by the CPU 502, stores a boot program, various applications, edit files, user files, etc. Network interface card (NIC) 508 performs bidirectional data transmission/reception, via a LAN 520, with external devices such as network printers, networked multifunction devices, networked PCs, etc. Mouse controller (MC) 513 controls a mouse (MS) 514. In the present embodiment, the LAN 520 is identical to the LAN 100 shown in FIG. 1.

Figure 6:
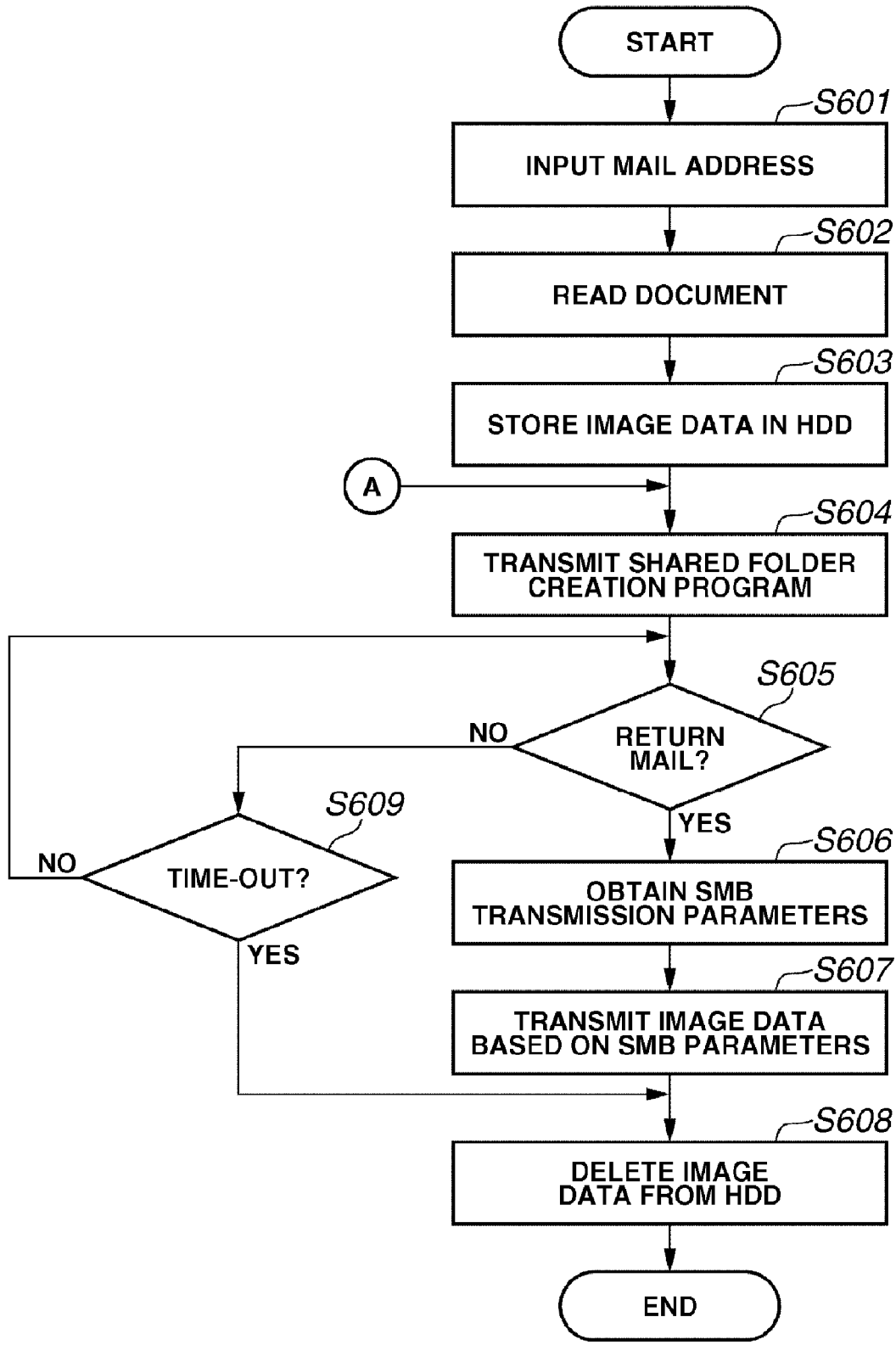
FIG. 6 is a flowchart illustrating image data transmission processing performed by the multifunction peripheral in accordance with the first exemplary embodiment.

FIG. 6 is a flowchart illustrating image data transmission processing performed by the multifunction peripheral 101 in accordance with the present embodiment. More specifically, the processing of FIG. 6 includes operations for causing a PC 500 (i.e., a receiver of image data) to create a shared folder in response to an instruction from the multifunction peripheral 101 and transmitting the image data to the produced shared folder. Each step of FIG. 6 can be executed in the multifunction peripheral 101 when the program stored in a memory (e.g., ROM 203 or HDD 204) is loaded into the RAM 202 and the CPU 201 executes the program.

Figure 7:
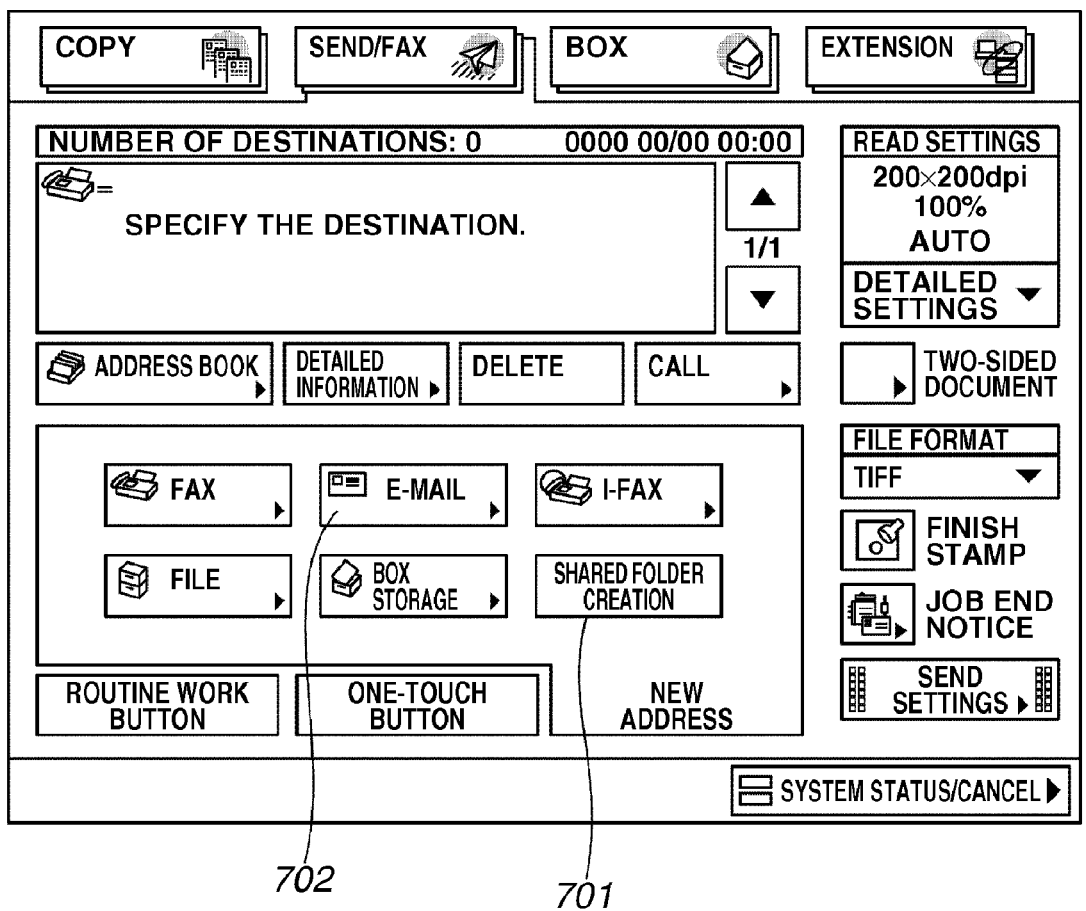
FIG. 7 is an example of a screen displayed on a liquid crystal touch panel of the multifunction peripheral in accordance with the first exemplary embodiment.

FIG. 7 is an example of a screen displayed on the liquid crystal touch panel 405 of the operating section illustrated in FIG. 4. When a user selects a shared folder creation button 701, the CPU 201 starts the processing associated with the flowchart of FIG. 6.

Figure 8:
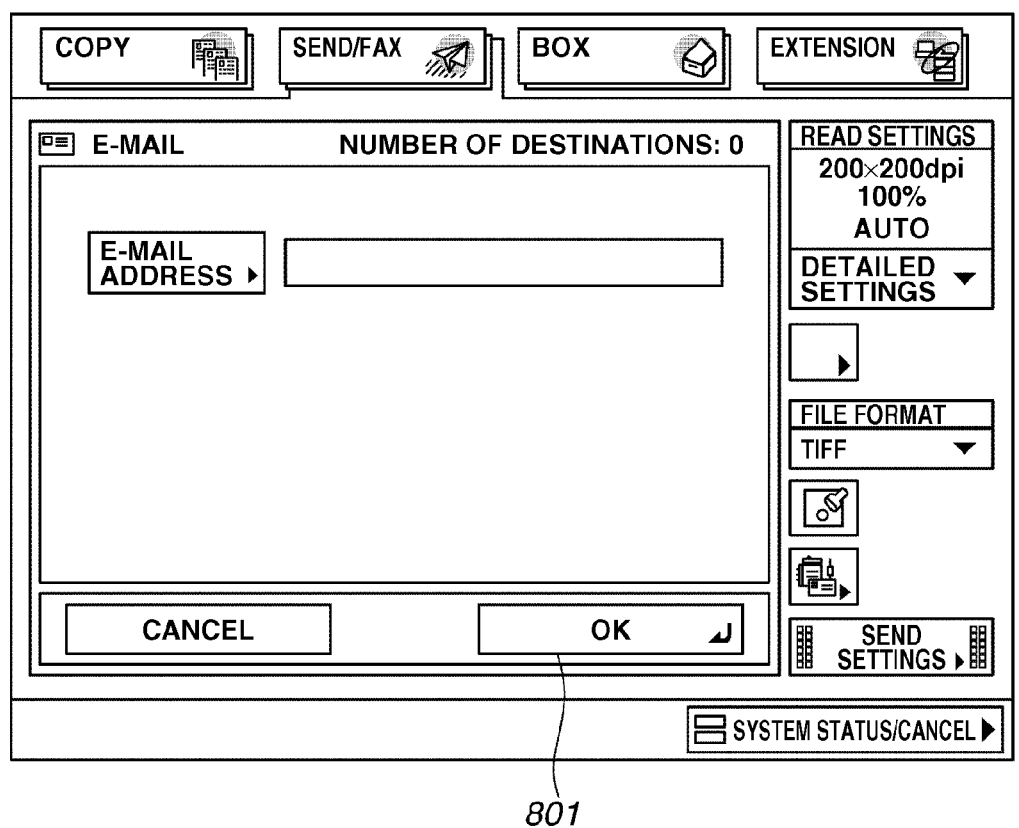
FIG. 8 is an illustration of a screen displayed on the liquid crystal touch panel of the multifunction peripheral in accordance with the first exemplary embodiment.

When the shared folder creation button 701 is selected, the screen of the liquid crystal touch panel 405 is switched to a screen illustrated in FIG. 8 which guides a user to input an electronic mail address. The user can input an electronic mail address using a soft keyboard displayed on the liquid crystal touch panel 405 or can select a predetermined address from the address book 302 stored in the multifunction peripheral 101.

Turning to FIG. 6, first, in step S601, the CPU 201 detects an electronic mail address entered by a user. Next, in step S602, the CPU 201 detects user's selection of the start key 402, which causes the scanner section 221 to start reading a document. Flow then proceeds to step S603, where the CPU 201 causes the HDD 204 to store image data read by the scanner section 221.

In step S604, the CPU 201 reads a "shared folder creation program" stored beforehand in the HDD 204 and transmits, to an electronic mail address entered in step S601, the shared folder creation program as an attached file of an electronic mail message. The shared folder creation program is a program for creating a shared folder (i.e., a storage destination of the image data read by the scanner section 221) in a PC 500 (i.e., receiver). The processing performed by the PC 500 when the shared folder creation program is received is described below.

Next, in step S605, the CPU 201 determines whether an electronic mail message is received in response to the electronic mail message transmitted in step S604. Receipt of an electronic mail message indicates creation of a shared folder. If an electronic mail message is received in step S605, the processing flow proceeds to step S606. If no electronic mail message is received, the processing flow proceeds to step S609.

In step S609, the CPU 201 determines whether a predetermined time has elapsed after transmission of the shared folder creation program attached to an electronic mail message. When the predetermined time has elapsed (i.e., YES in S609), the processing flow proceeds to step S608. In step S608, the CPU 201 deletes the image data stored in the HDD 204 (refer to step S603) and terminates the processing.

In step S606, the CPU 201 obtains, from the response electronic mail message, parameters required for transmitting the image data to the produced shared folder. The present embodiment uses SMB transmission to send the image data read by the multifunction peripheral 101 to the PC 500. The present invention is not limited to using SMB transmission, and any transmission method that would enable practice of the present invention is applicable. The parameters required for the SMB transmission include an ID (a host name) of a destination (i.e., PC 500) and information indicating a storage destination (i.e., a folder path) that stores the transmitted image data. Furthermore, the parameters include a user name and a password required to access the storage destination (i.e., a folder). In step S606, the CPU 201 can obtain this information from the response electronic mail message.

In step S607, the CPU 201 sets the information obtained in step S606 as SMB transmission parameters and transmits the image data stored in the HDD 204. To transmit the image data, the multifunction peripheral 101 accesses a PC 500 (i.e., transmission destination of image data) based on the host name obtained in step S606, and establishes a communication path to the PC 500. Next, the multifunction peripheral 101 transmits, to the PC 500, the information indicating the storage destination (i.e., folder path), the user name, and the password obtained in step S606.

When access to the designated storage destination (folder) is accepted, the multifunction peripheral 101 returns a permission notice to the PC 500. The multifunction peripheral 101, when the permission is received, designates information indicating the storage destination (i.e., folder path) and transmits, to the PC 500, the image data stored in the HDD. The PC 500, when the image data is received, stores the image data into the designated storage destination (i.e., a folder). After accomplishing the transmission, the CPU 201 deletes the image data stored in the HDD 204 and terminates the processing.

The SMB transmission parameters obtained in step S606 can be automatically registered in the address book 302 of the multifunction peripheral 101. Alternatively, a user can determine whether or not the parameters are registered in the address book 302, so that the user can select registration or abandonment of the parameters. Accordingly, a user is not required to repetitively obtain or input the SMB transmission parameters in the next and succeeding operations. The CPU 201 can read the SMB transmission parameters from the address book 302.

Figure 9:
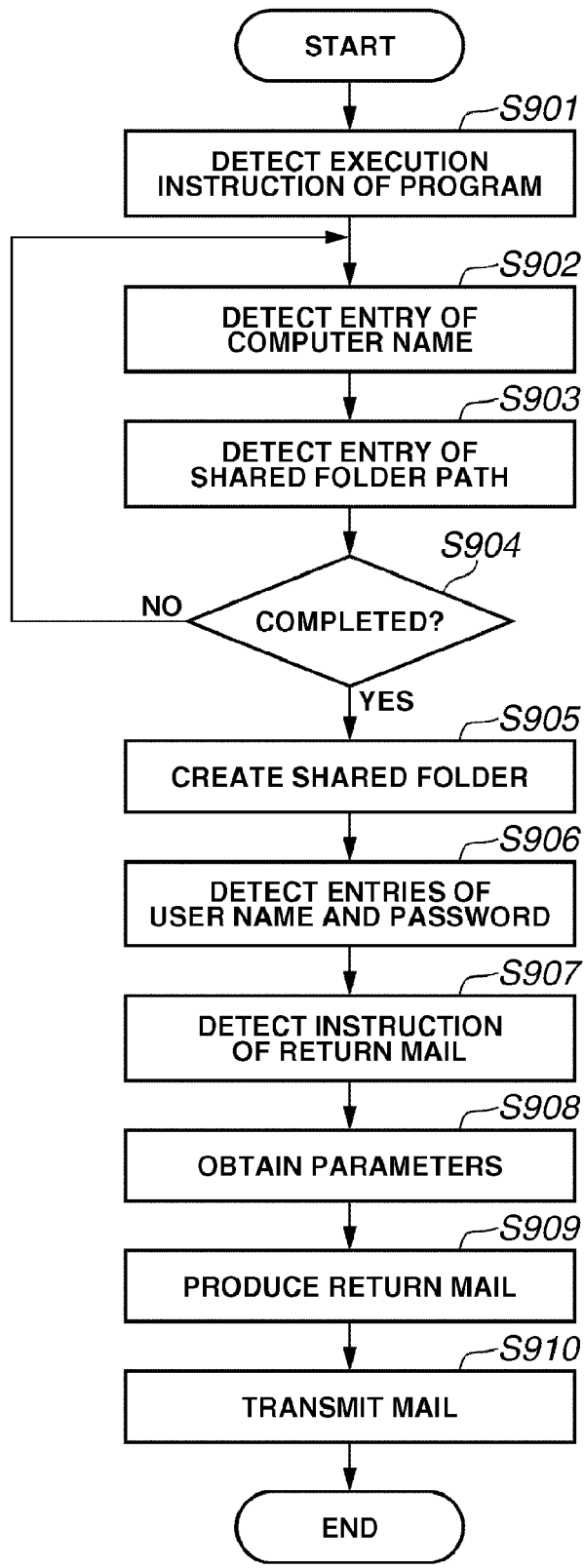
FIG. 9 is a flowchart illustrating processing performed by a PC in accordance with the first exemplary embodiment.

FIG. 9 is a flowchart illustrating processing performed by the PC 500 in accordance with the present embodiment in response to reception of the shared folder creation program. More specifically, when the electronic mail message including the shared folder creation program is transmitted from the multifunction peripheral 101 (refer to step S604 of FIG. 6), the PC 500 executes the processing shown in FIG. 9. In the flowchart of FIG. 9, the processing of steps S902 to S906 is executed by the shared folder creation program and the processing of other the steps is executed by the CPU 502 according to a program read out of the ROM 503 or HDD 511 into the RAM 504.

First, in step S901, the CPU 502 detects an execution instruction of the shared folder creation program attached to an electronic mail message received from the multifunction peripheral 101. When the execution instruction of the shared folder creation program is detected in step S901, the CPU 502 executes the shared folder creation program. The CRT 510 of the PC 500 displays a screen as illustrated in FIG. 10.

Figure 10:
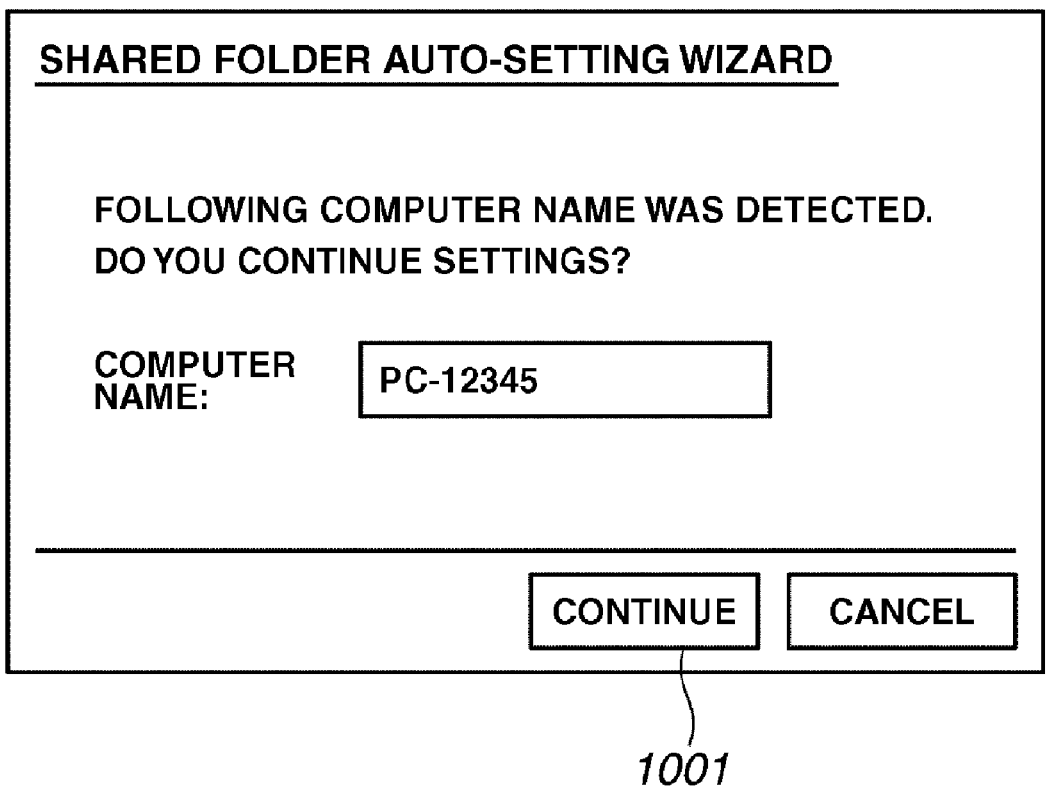
FIG. 10 is a view illustrating a screen displayed on a display unit of the PC in accordance with the first exemplary embodiment.

The screen illustrated in FIG. 10 is an initial screen of the shared folder creation program that enables a user to input a computer name (i.e., a host name) of the PC 500. As depicted in FIG. 10, the shared folder creation program can detect the computer name of the PC 500 and can automatically display the computer name on the screen of FIG. 10. Thus, a user is not required to input a computer name. In addition, the screen depicted in FIG. 10 also includes continue button 1001, which is described below.

Figure 11:
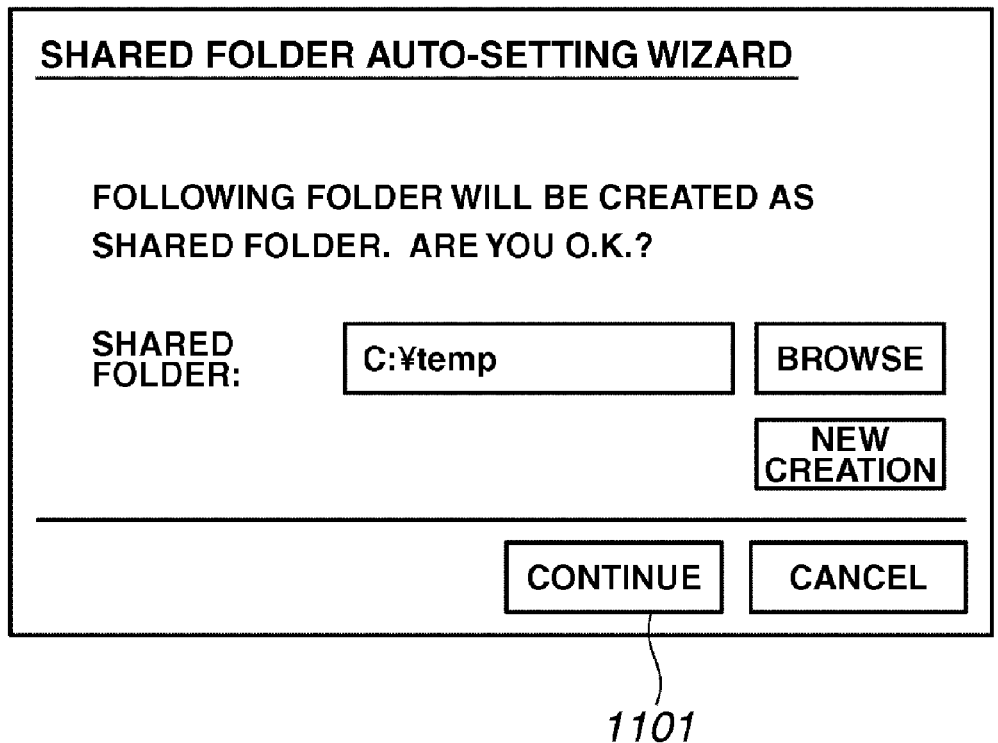
FIG. 11 is a view illustrating a screen displayed on the display unit of the PC in accordance with the first exemplary embodiment.

Next, in step S902, the shared folder creation program detects entry of the computer name and the user's selection of the continue button 1001, and causes the CRT 510 to display a screen illustrated in FIG. 11. The screen depicted in FIG. 11 enables a user to input a path to the shared folder. According to the example illustrated in FIG. 11, a shared folder "temp" is created in a C drive of the PC 500. The path to the shared folder can be arbitrarily designated by a user. Alternatively, the shared folder creation program can automatically determine candidates and let a user select an appropriate one from the candidates displayed on the screen of FIG. 11. Thus, the burden placed on an operator of the PC 500 can be reduced.

In step S903, the shared folder creation program detects entry of the shared folder path and the user's selection of the continue button 1101 from the screen depicted in FIG. 11. Then, in step S904, the shared folder creation program determines whether the entries of both the computer name and the shared folder path have been accomplished. When the entries are accomplished (i.e., YES in step S904), the processing flow proceeds to step S905.

In step S905, the shared folder creation program produces a shared folder at a predetermined place based on the information entered in step S903. The display screen of the CRT 510 is switched to a screen illustrated in FIG. 12. The screen depicted in FIG. 12 enables a user to input a user name and a password to access the created shared folder. In step S906, the shared folder creation program terminates according to detecting that the user ID and the password having been inputted into the screen of FIG. 12 and a complete button 1201 were selected.

Flow then proceeds to step S907, where the CPU 502 detects an instruction of a user who requests a return mail responding to the electronic mail message transmitted from the multifunction peripheral 101. In step S908, the CPU 502 obtains the parameters entered in steps S902, S903, and S906 when the return mail instruction is detected in step S907. More specifically, the CPU 502 obtains the parameters (e.g., host name, shared folder path, user name, and password) required when the multifunction peripheral 101 performs SMB transmission to send the image data to the PC 500.

After the parameters are obtained in step S908, in step S909, the CPU 502 produces an electronic mail message including the parameters obtained in step S908. Then, in step S910, the CPU 502 transmits the electronic mail message produced in step S909 to the multifunction peripheral 101. The CPU 502 then terminates the process of depicted in FIG. 9.

Figure 12:
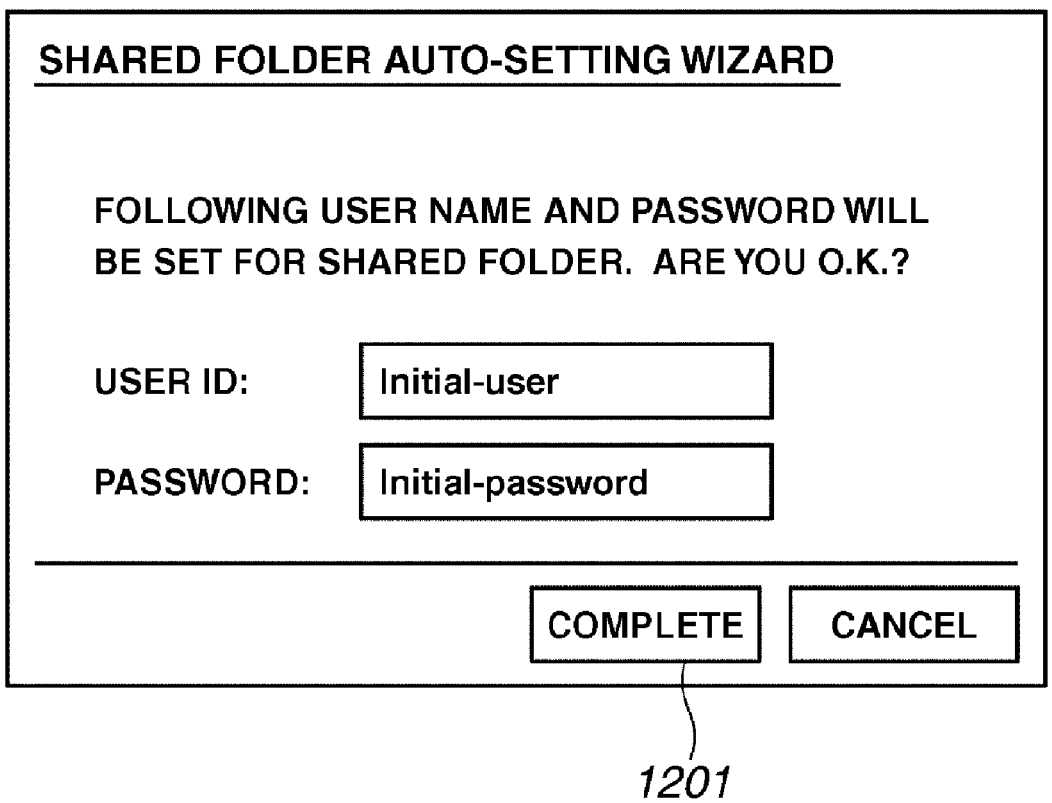
FIG. 12 is a view illustrating a screen displayed on the display unit of the PC in accordance with the first exemplary embodiment.

Although the CPU 502 performs the processing of steps S908-S910 in response to the instruction of a user who requests a return mail (refer to step S907), the processing of steps S908-910 can be automatically performed when the complete button 1201 shown in FIG. 12 is selected by a user (refer to step S906). More specifically, upon a user entry of SMB transmission parameters required to transmit image data from the multifunction peripheral 101 to the PC 500, the CPU 502 can automatically produce an electronic mail message, including the parameters, and transmit the produced electronic mail message to the multifunction peripheral 101.

As described above, according to the present embodiment, the multifunction peripheral 101 transmits, to a PC 500, a program capable of producing a shared folder. The shared folder creation program enables an operator of the PC 500 to easily produce a shared folder. Furthermore, when the shared folder is produced in the PC 500, the multifunction peripheral 101 can perform SMB transmission to send image data to the PC 500.

Second Exemplary Embodiment

According to the above-described first exemplary embodiment, the multifunction peripheral 101 transmits image data in response to reception of a return mail from a PC 500. In the second exemplary embodiment, the multifunction peripheral 101 transmits image data when a predetermined time has elapsed after transmission of a shared folder creation program. Thus, the PC 500 is not required to send a return mail notifying a created shared folder to the multifunction peripheral 101. The system, the multifunction peripheral 101, and the PC 500 shown in FIGS. 1 through 5 are applicable to the present embodiment, and thus, their detailed descriptions are omitted herein.

Figure 13:
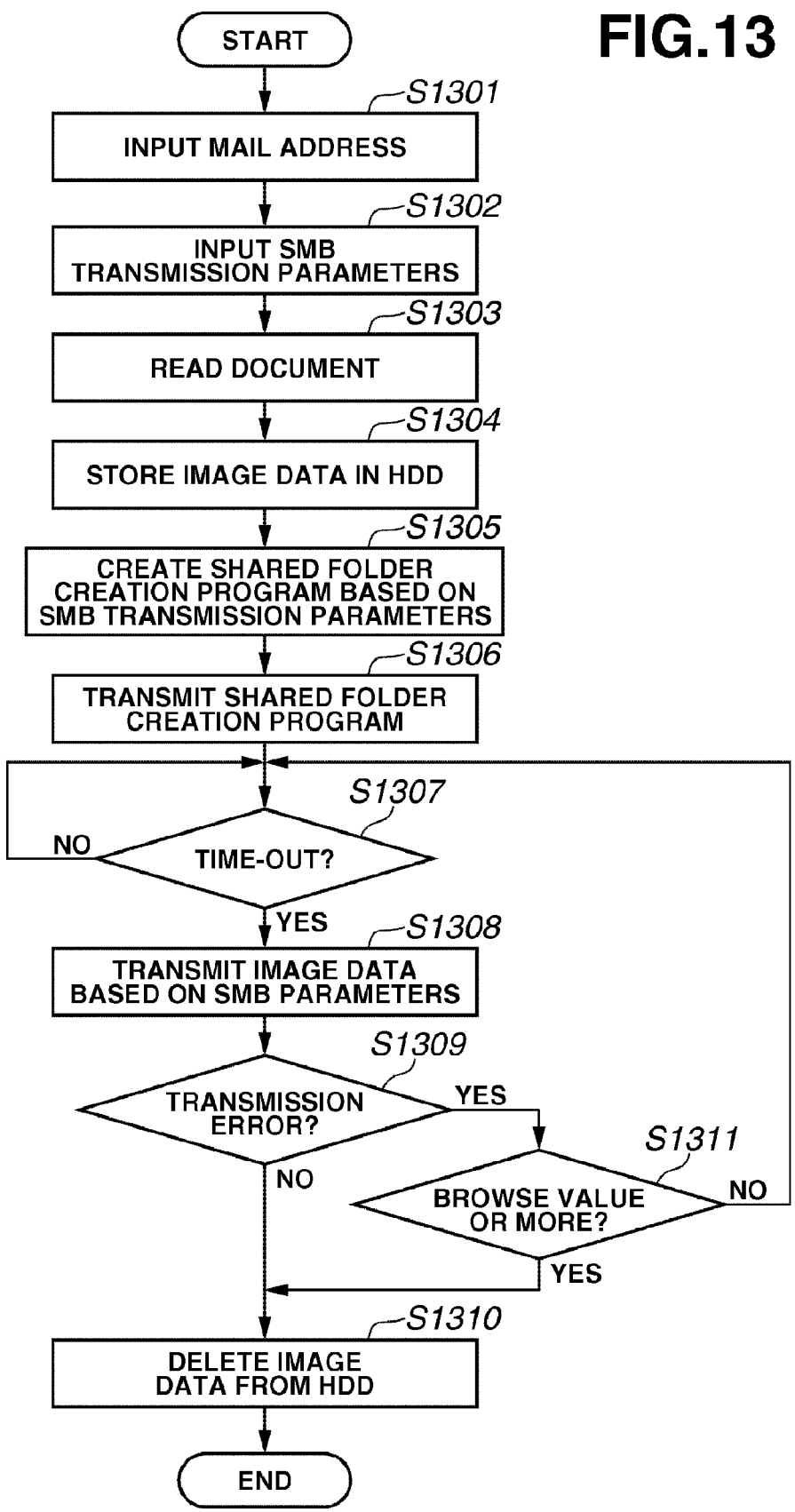
FIG. 13 is a flowchart illustrating image data transmission processing performed by the multifunction peripheral in accordance with a second exemplary embodiment of the present invention.

FIG. 13 is a flowchart illustrating image data transmission processing performed by the multifunction peripheral 101 in accordance with the present embodiment. More specifically, the flowchart of FIG. 13 includes operations for causing a PC 500 (i.e., a receiver of image data) to create a shared folder in response to an instruction of the multifunction peripheral 101 and transmitting image data to the produced shared folder. Each step of FIG. 13 can be executed in the multifunction peripheral 101 when the program stored in a memory (e.g., ROM 203 or HDD 204) is loaded into the RAM 202 and the CPU 201 executes the program. The process of FIG. 13, like the process of FIG. 6 described above, is initiated when a user selects the shared folder creation button 701.

Following the selection of the shared folder creation button 701, in step S1301, the CPU 201 detects an electronic mail address entered by a user. When the electronic mail address is entered in step S1301, and the OK button 801 is selected by a user, the processing flow proceeds to step S1302.

In step S1302, the CPU 201 causes the liquid crystal touch panel 405 to display an input screen (not shown) of parameters required for SMB transmission of image data read by a scanner section 221 and sent to a predetermined destination. More specifically, the screen enables a user to input a host name of the transmission destination, a folder path (i.e., storage destination of the image data), and a user name and a password required to access the folder (i.e., the storage destination of the image data).

When the entry of each parameter is completed, the processing flow proceeds to step S1303. In step S1303, the CPU 201 detects a user's selection of the start key 402 and causes the scanner section 221 to start reading a document. The host name of a transmission destination entered in step S1302 is a host name of a PC 500 corresponding to the electronic mail address entered in step S1301. Thus, the transmission destination of a shared folder creation program and the transmission destination of image data stored in the HDD are the same.

Figure 14:
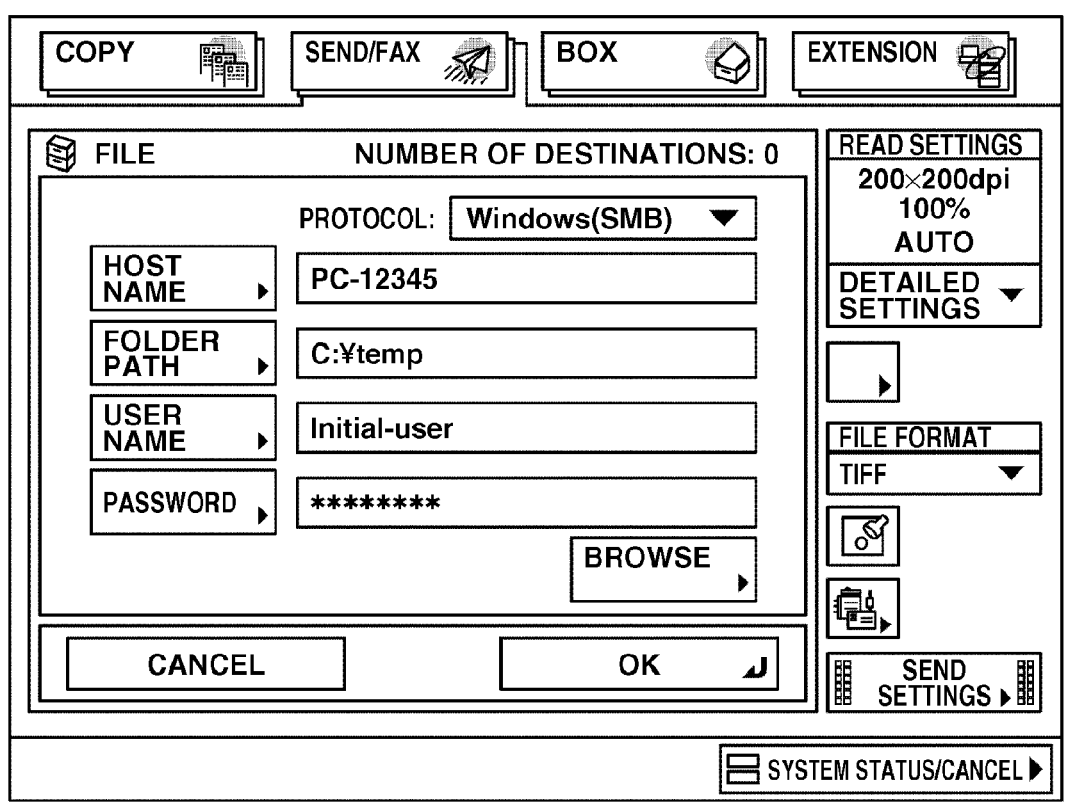
FIG. 14 is a view illustrating a screen displayed on the liquid crystal touch panel of the multifunction peripheral in accordance with the second exemplary embodiment.

FIG. 14 is a view illustrating a screen displayed after the entry of the SMB transmission parameters is completed. According to the example illustrated in FIG. 14, host name is "PC 12345", folder path is "C:¥temp", user name is "Initial-user", and password is "Initial-password", but is displayed using "********."

Returning to FIG. 13, in step S1304, the CPU 201 stores the image data read by the scanner section 221 onto the HDD 204. Next, in step S1305, the CPU 201 reads the parameters entered in step S1302 and creates a shared folder creation program that can produce a shared folder based on the parameters. According to the example illustrated in FIG. 14, the shared folder is created in a "C:¥temp" folder of the PC 500 corresponding to the host name "PC 12345."

In step S1306, the CPU 201 transmits, as an attached file of an electronic mail message, the shared folder creation program created in step S1305 to the electronic mail address entered in step S1301. In this case, a reference file including the parameters entered in step S1302 can be added to the shared folder creation program stored beforehand on the HDD 204 and can be transmitted together to a PC 500. The PC 500 can create a shared folder with reference to the information involved in the reference file when executing the shared folder creation program.

In step S1307, the CPU 201 determines whether a predetermined time (e.g., ten minutes) has elapsed after transmission of the shared folder creation program in step S1306. The predetermined time can be designated by a user. The multifunction peripheral 101 has a timer that can measure the time elapsed after transmission of the shared folder creation program in step S1306. The CPU 201 uses the time information obtained by the timer.

When the CPU 201 determines that the predetermined time has elapsed after transmission of the shared folder creation program (i.e., YES in step S1307), the processing flow proceeds to step S1308. In step S1308, the CPU 201 transmits the image data stored in the HDD 204 based on the SMB transmission parameters entered in step S1302.

More specifically, the multifunction peripheral 101 first accesses a PC 500 (i.e., transmission destination of image data) based on the host name entered in step S1302. Then, the multifunction peripheral 101 establishes a communication path to the PC 500 (i.e., transmission destination). Next, the multifunction peripheral 101 transmits, to the PC 500, the information indicating the storage destination (i.e., folder path) and the user name and the password entered in step S1302.

When access to the designated storage destination (folder) is accepted, a permission notice is returned from the PC 500 to the multifunction peripheral 101. The multifunction peripheral 101, when the permission is received, designates information indicating the storage destination (i.e., folder path) and transmits, to the PC 500, the image data stored in the HDD 204. The PC 500, when the image data is received, stores the image data into the designated storage destination (i.e., a folder).

Following step S1308, in step S1309, the CPU 201 determines whether the SMB transmission of image data succeeded. If there was a transmission error, the processing flow proceeds to step S1311. If the transmission succeeded, the processing flow proceeds to step S1310. In step S1310, the CPU 201 deletes the image data stored on the HDD 204 and terminates the processing of the flowchart.

In step S1311, the CPU 201 determines whether a total number of transmission errors is equal to or greater than a reference value. When the total number of transmission errors is less than the reference value (i.e., NO in step S1311), the processing flow returns to step S1307 to wait for the predetermined time to elapse. When the total number of transmission errors is equal to or greater than the reference value (i.e.,  YES in step S1301), the processing flow proceeds to step S1310 to delete the image data stored on the HDD, and then the processing depicted in FIG. 13 terminates.

In other words, the PC 500 (i.e., transmission destination) may not be able to finish creating a shared folder when the image data is received. Thus, the CPU 201 retries the SMB transmission of image data after a predetermined time has elapsed. However, if a sufficient time has elapsed (i.e., YES in step S1311), the CPU 201 determines that transmission of image data is unfeasible regardless of the presence of an appropriate shared folder or determines that no shared folder has been created. The CPU 201 stops retransmitting the data and terminates the processing. The reference value used in step S1311 can be determined by a user.

Figure 15:
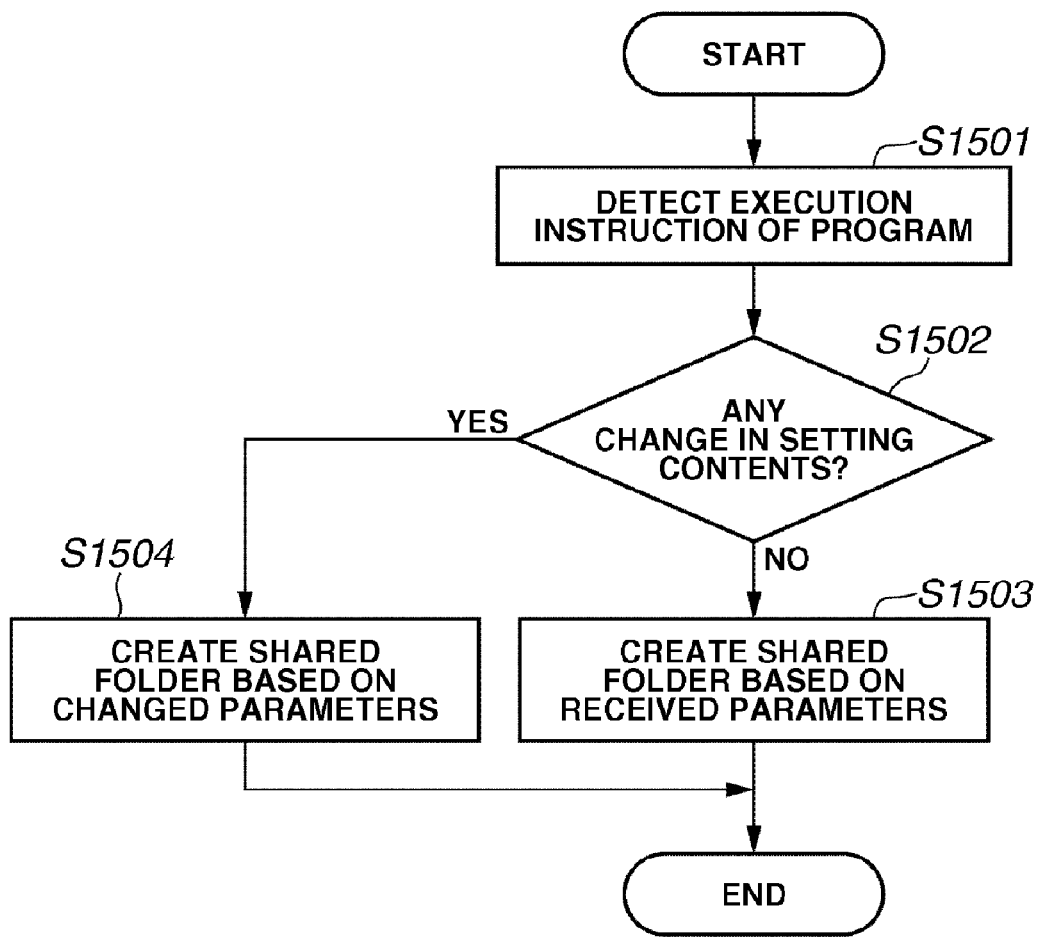
FIG. 15 is a flowchart illustrating processing performed by a PC in accordance with the second exemplary embodiment.

FIG. 15 is a flowchart illustrating processing performed by the PC 500 when the shared folder creation program is received in accordance with the present embodiment. More specifically, the PC 500 executes the processing illustrated in FIG. 15 when an electronic mail message including the shared folder creation program is transmitted from the multifunction peripheral 101 (refer to step S1306 of FIG. 13). In FIG. 15, the processing of steps S1502 to S1504 is executed by the shared folder creation program in the PC 500. The PC 500 corresponds to each of the PCs 102-105 depicted in FIG. 1.

In step S1501, the CPU 502 detects an execution instruction of the shared folder creation program involved in the electronic mail message transmitted from the multifunction peripheral 101. When the execution instruction of the shared folder creation program is detected in step S1501, the CPU 502 executes the shared folder creation program and the CRT 510 of the PC 500 displays the screen illustrated in FIG. 10. The screen illustrated in FIG. 10 enables a user to input a computer name (i.e., a host name) of the PC 500. In the present embodiment, the host name "PC 12345" entered in step S1302 of FIG. 13 is already displayed on the screen. Thus, the user selects the continue button 1001 unless the computer name needs to be changed. The CRT 510 of the PC 500 is switched to the screen illustrated in FIG. 11.

The screen illustrated in FIG. 11 enables a user to input a place of a newly created shared folder. In the present embodiment, the folder path "C:¥temp" entered in step S1302 of FIG. 13 is already displayed on the screen. Thus, the user selects the continue button 1101 unless the folder path needs to be changed. The CRT 510 of the PC 500 is switched to the screen illustrated in FIG. 12.

The screen illustrated in FIG. 12 enables a user to input a user name and a password to access the created shared folder. In the present embodiment, the user name "Initial-user" and the password "Initial-password" entered in step S1302 of FIG. 13 are already displayed. When the CPU 201 detects a user's selection of the complete button 1201, the processing flow proceeds to step S1502 in FIG. 15.

In step S1502, the shared folder creation program determines whether any change occurs in the parameters (e.g., host name, folder path, user name, and password) set beforehand for the received shared folder creation program. If there is no change (i.e., NO in step S1502), the processing flow proceeds to step S1503, in which a shared folder is created based on the parameters transmitted from the multifunction peripheral 101. On the other hand, when any change occurs (i.e., YES in step S1502), the processing flow proceeds to step S1504, in which a shared folder is created based on changed parameters.

The multifunction peripheral 101, when a predetermined time has elapsed after transmitting the shared folder creation program to the PC 500, transmits the image data based on the parameters entered in step S1302 of FIG. 13. However, if a folder is created based on the changed parameters in step S1504 of FIG. 15, the image data cannot be received. Hence, when a shared folder is created based on the changed parameters in step S1504, the PC 500 can notify the multifunction peripheral 101 of the change of parameters.

As described above, according to the present embodiment, the PC 500 is not required to notify the multifunction peripheral 101 of the creation of a shared folder. Furthermore, the multifunction peripheral 101 can start transmitting image data without waiting for a notice of creation of a shared folder from the PC 500.

Third Exemplary Embodiment

Transmission of an electronic mail message including the image data read by the scanner section 221 of the multifunction peripheral 101 may be rejected if the size of the message exceeds a predetermined upper limit. The predetermined upper limit depends on the settings of a multifunction peripheral or the settings of a mail server. FIG. 16 is a view illustrating a screen displayed on the liquid crystal touch panel 405 of the multifunction peripheral 101 enabling a user to set an upper limit size of a file attached to an electronic mail message.

In general, when an electronic mail message including the image data read by the scanner section 221 is transmitted, if the size of an attached file exceeds a maximum transmissible size, the file of the image data can be divided into a plurality of electronic mail messages. However, for many users, dividing a file of image data may be cumbersome.

Hence, the present embodiment provides a multifunction peripheral configured to transmit image data read by a scanner section, without dividing the image data file, even when an electronic mail message including the image data exceeds a transmissible size. The system, the multifunction peripheral 101, and the PC 500 illustrated in FIGS. 1 through 5 are applicable to the present embodiment, and thus their detailed descriptions are omitted herein.

Figure 17:
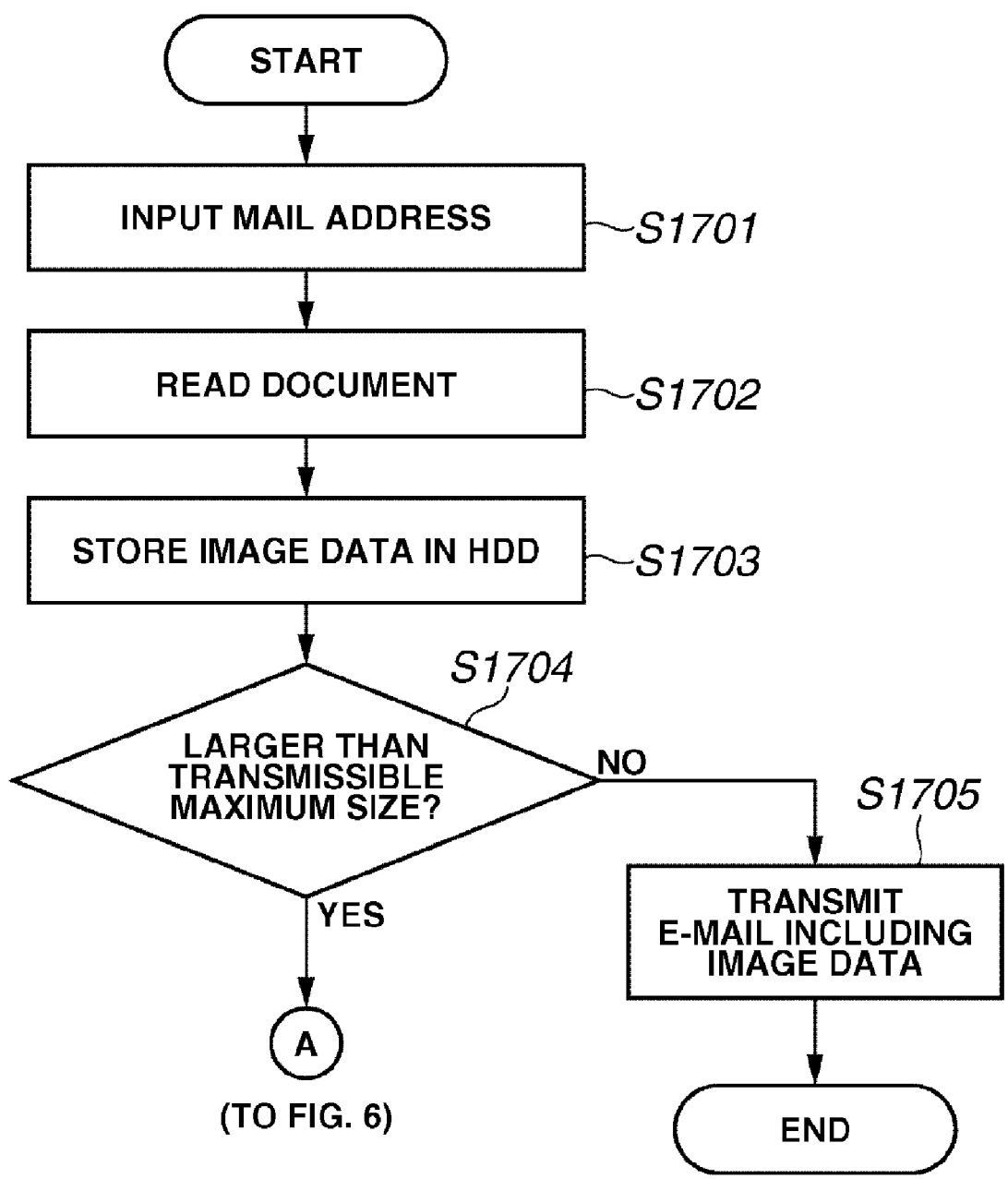
FIG. 17 is a flowchart illustrating image data transmission processing performed by the multifunction peripheral in accordance with the third exemplary embodiment.

FIG. 17 is a flowchart illustrating image data transmission processing performed by the multifunction peripheral 101 in accordance with the present embodiment. Each step of FIG. 17 can be executed in the multifunction peripheral 101 when the program stored in a memory (e.g., ROM 203 or HDD 204) is loaded into the RAM 202 and the CPU 201 executes the program. The processing of the flowchart illustrated in FIG. 17 automatically starts when an electronic mail button 702 is selected by a user on the screen of the liquid crystal touch panel 405 of the multifunction peripheral 101 illustrated in FIG. 7.

First, in step S1701, the CPU 201 detects an electronic mail address entered by a user. Next, in step S1702, the CPU 201 causes the scanner section 221 to start reading a document. After the document is read, the processing flow proceeds to step S1703. In step S1703, the CPU 201 stores the read image data onto the HDD 204. Then, in step S1704, the CPU 201 determines whether the size of the image data stored on the HDD is greater than the maximum size of a file that can be attached to an electronic mail message.

When the size of the image data is transmissible (i.e., NO in step S1704), the processing flow proceeds to step S1705. In step S1705, the CPU 201 transmits an electronic mail message including the read image data to the address entered in step S1701. On the other hand, when the size of the image data is not transmissible (i.e., YES in step S1704), the CPU 201 cancels the electronic mail message transmission and executes SMB transmission.

More specifically, the processing flow proceeds to step S604 of FIG. 6 (refer to position "A"). In other words, the CPU 201 executes the processing of the first exemplary embodiment. Thus, even when a shared folder is not present in the PC 500 (i.e., transmission destination), the multifunction peripheral 101 can transmit a shared folder creation program to the PC 500 so that a shared folder can be created by the PC 500 and SMB transmission of the image data can be realized.

In another exemplary embodiment, instead of executing the processing of step S604 of FIG. 6, the CPU 201 can execute step S1305 illustrated in FIG. 13. More specifically, when the image data exceeds a maximum transmissible size, the processing of the second exemplary embodiment can be employed. In this case, a user is required to input SMB transmission parameters at the multifunction peripheral 101 (refer to step S1302 of FIG. 13).

In still yet another embodiment, when the image data size is not transmissible (i.e., YES in step S1704), a user can determine whether the processing flow proceeds to the processing of FIG. 6 (i.e., first exemplary embodiment) or to the processing of FIG. 13 (i.e., second exemplary embodiment). In this case, a selection screen (not shown) is displayed that guides a user to select from among a list of options displayed on the liquid crystal touch panel 405.

As described above, even when the image data read by the scanner section 221 cannot be transmitted as an electronic mail message attachment, the third embodiment can transmit the image data without dividing a file.

Other Exemplary Embodiment

According to at least one of the above-described exemplary embodiments, the multifunction peripheral 101 transmits image data to a PC 500. In another embodiment, the image data can be transmitted from one multifunction peripheral to another multifunction peripheral. More specifically, the present invention is not limited to transmitting image data between any two particular types of network devices, and any network device capable of transmitting data to another device would be applicable under the present invention.

According to at least one of the above-described exemplary embodiments, a shared folder creation program is attached to an electronic mail message. The present invention is not limited to electronic mail messages, and any other communication medium capable of transmitting the shared folder creation program to an external apparatus that would enable practice of the present invention is applicable. For example, the shared folder creation program can be stored in a multifunction peripheral. An electronic mail message including information indicating the storage destination (e.g., URL) of the shared folder creation program can be transmitted to an external apparatus. The external apparatus can access the multifunction peripheral to download the shared folder creation program from the storage destination (e.g., URL).

Software program code for realizing the functions of the above-described exemplary embodiments can be supplied, via a storage medium (or a recording medium), to a system or an apparatus. A computer (or CPU or MPU) in the system or the apparatus can read the program code stored in the storage medium and can execute the readout program.

In this case, the program code read out from the storage medium can realize the functions of the exemplary embodiments. The equivalents of programs can be used if they possess comparable functions. Accordingly, when the functions or processes of the exemplary embodiments are realized by a computer, program code installed in the computer and a recording medium storing the program are used to implement the present invention.

In other words, the present invention encompasses a computer program that can realize the functions or processes of the exemplary embodiments or any recording medium that can store the program. In this case, the type of program can be any one of object code, interpreter program, and OS script data. A recording medium supplying the program can be selected from any one of a floppy disk, a hard disk, an optical disk, a magneto-optical disk, an MO, a CD-ROM, a CD-R, a CD-RW, a magnetic tape, a nonvolatile memory card, a ROM, and a DVD (DVD-ROM, DVD-R).

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers or FTP servers that allow numerous users to download the program files so that the functions or processes of the present invention can be realized on their computers.

Furthermore, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, not only the functions of the above-described exemplary embodiments can be realized by a computer that executes the programs, but also an operating system (OS) running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

The present invention can be applied to a system including plural devices or can be applied to a single apparatus. Moreover, the present invention can be realized by supplying the program(s) to a system or an apparatus. In this case, the system or the apparatus can read the software program relating to the present invention from a storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-345973 filed Nov. 30, 2005, which is hereby incorporated by reference herein in its entirety.

What is claimed is:

1. A system including an external apparatus and a data processing apparatus, the data processing apparatus comprising:

a first operation unit configured to accept, from a user, an instruction for reading of an original document and an electronic mail address;

a scanner unit configured to optically read the original document in response to accepting of the instruction, and generate image data corresponding to the original document;

a program transmission unit configured to transmit an electronic mail message attaching the program for creating a shared folder for storing the image data, to a destination of the accepted electronic email, wherein the program is received by the external apparatus;

a reception unit configured to receive, from the external apparatus, a path of the shared folder and authentication information;

a first transmission unit automatically transmits, using the received authentication information, the image data to the shared folder identified by the received path; and the external apparatus comprising:

a program reception unit configured to receive the program transmitted from the data processing apparatus;

a second operation unit configured to accept, from the user, authentication information and a path of a shared folder permitted to be accessed by the authentication information, via a screen displayed by activating the received program;

a creation unit configured to create the shared folder; and a second transmission unit configured to transmit the path of the shared folder and the authentication information to the data processing apparatus.

2. The system according to claim 1, wherein the program transmission unit performs transmission to the shared folder, by using an SMB (Server Message Block) protocol.

3. The system according to claim 1, wherein the storage destination is a shared folder configured to store the inputted data transmitted using a server message block.

4. A method for controlling a system including an external apparatus and a data processing apparatus, comprising:

a first accepting step of accepting, from a user, an instruction for reading of an original document and an electronic mail address;

a generation step of optically reading the original document in response to accepting of the instruction for reading of the original document, and generating image data corresponding to the original document;

a transmission step of transmitting an electronic mail message attaching the program for creating a shared folder for storing the image data, to a destination of the accepted electronic mail address, in response to accepting of the instruction for reading of the original document, wherein the program is received by the external apparatus;

a reception step of receiving, from the external apparatus, a path of the shared folder for storing image data and authentication information;

a transmission step of automatically transmitting, using the received authentication information, the image data corresponding to the original document read according to the instruction for reading of the original document, to the shared folder identified by the received path; and a reception step of receiving the program transmitted from the data processing apparatus;

a second accepting step of accepting, from the user, authentication information and a path of a shared folder permitted to be accessed by the authentication information, via a screen displayed by activating the received program;

a creation step of creating the shared folder; and a transmission step of transmitting the path of the shared folder and the authentication information of the data processing apparatus.

5. A data processing apparatus communicating with an external apparatus, comprising:

a first operation unit configured to accept, from a user, an instruction for reading of an original document and an electronic mail address;

a scanner unit configured to optically read the original document in response to accepting of the instruction, and generate image data corresponding to the original document;

a program transmission unit configured to transmit an electronic mail message attaching the program for creating a shared folder for storing the image data, to a destination of the accepted electronic mail address, wherein the program is received by the external apparatus, and the external apparatus accepts authentication information and a path of a shared folder permitted to be accessed by the authentication information, from the user, via a screen displayed by activating the program, creates the shared folder, and transmits the path of the shared folder and the authentication information to the data processing apparatus; and a reception unit configured to receive, from the external apparatus, the path of the shared folder and the authentication information;

the transmission unit automatically transmits, using the received authentication information, the image data to the shared folder identified by the received path.

* * * * *